United States Patent [19]

Kondo et al.

[11] Patent Number: 5,032,369
[45] Date of Patent: Jul. 16, 1991

[54] METHOD OF REMOVING SILICON FROM WASTE HYDROCHLORIC ACID PICKLING SOLUTIONS FOR STEEL STOCK

[75] Inventors: Hidenobu Kondo, Sawara; Tatsuhiko Shigematsu, Saga; Masatake Tateno, Osaka; Yatsuhiro Kawara, Chiba; Yoshihisa Makino, Kashiwa, all of Japan

[73] Assignee: Sumitomo Metal Industries, Ltd., Osaka, Japan

[21] Appl. No.: 286,875

[22] Filed: Dec. 20, 1988

[51] Int. Cl.$^5$ ............................................. C01B 33/037
[52] U.S. Cl. .............................. 423/339; 423/DIG. 1; 210/738
[58] Field of Search ................. 423/DIG. 1, 633, 140, 423/142, 339, 348, 349, 324; 210/738, 787, 80 G

[56] References Cited
FOREIGN PATENT DOCUMENTS

| 0249545 | 12/1987 | European Pat. Off. | 423/349 |
| 0162424 | 12/1980 | Japan | 423/349 |
| 1178403 | 8/1986 | Japan | 423/349 |
| 3129019 | 6/1988 | Japan | 423/DIG. 1 |
| 3144121 | 6/1988 | Japan | 423/DIG. 1 |
| 3144122 | 6/1988 | Japan | 423/DIG. 1 |
| 3144123 | 6/1988 | Japan | 423/DIG. 1 |
| 1111990 | 9/1984 | U.S.S.R. | 423/349 |

OTHER PUBLICATIONS

Hackh's Chemical Dictionary, Fourth Edition, Grant ed., p. 133.

Primary Examiner—Olik Chaudhuri
Assistant Examiner—Kenneth Horton
Attorney, Agent, or Firm—Burns, Doane, Swecker & Mathis

[57]  ABSTRACT

A method of removing silicon from a waste hydrochloric acid pickling solution is disclosed which comprises stirring the waste solution long enough to form a sludge having a particle size such that the sludge can be separated by a conventional means such as filtration through a filter of at least 0.1 μm in pore diameter, centrifugation or sedimentation. The stirring period can be greatly reduced by adding to the waste pickling solution sludge recovered from an aged waste hydrochloric acid pickling solution or a carbonaceous material such as carbon black having hydrophilic groups on the surface. The sludge is also useful as a filter medium in filtration of the waste pickling solution to remove silicon. The present method can decrease the silicon content to 0.01% or less in terms of converted $SiO_2/Fe_2O_3$ weight ratio.

4 Claims, 5 Drawing Sheets

▲: $SiO_2 \cdot nH_2O$

METHOD OF REMOVING SILICON FROM WASTE HYDROCHLORIC ACID PICKLING SOLUTIONS FOR STEEL STOCK

BACKGROUND OF THE INVENTION

This invention relates to a method of removing silicon from waste hydrochloric acid pickling solutions which are formed during the pickling of steel stock such as steel plate, steel shapes, and steel rods.

As shown in Table 1, waste hydrochloric acid pickling solutions for steel stock (hereinunder referred to simply as "waste pickling solutions") generally contain a large quantity (100-200 g/l) of iron. It is possible to recover this iron and use it for the manufacture of ferric oxide for ferrite.

TABLE 1

| Composition of waste pickling solution | | | |
|---|---|---|---|
| Fe | Si | Al | Mn |
| 100-200 g/l | 30-120 mg/l | 30-60 mg/l | 400-700 mg/l |

Methods for manufacturing ferric oxide from such a waste pickling solution include the roasting method, the neutralizing method, and other methods, but industrially, the roasting method is generally employed because it can recover hydrochloric acid and can also produce high-purity ferric oxide.

Table 2 shows the composition of ferric oxide which is obtained by roasting of waste pickling solution without refining of the solution. It can be seen that in addition to Fe, this ferric oxide contains metallic impurities such as Si, Al, and Mn.

Table 3 shows JIS K1462 quality specifications for "Iron oxide (III) for Ferrite". Class 1 ferric oxide in this table is the highest quality. It can be seen from this table that the quality of ferric oxide for ferrite is primarily determined by the content of $SiO_2$. It can also be seen that except for $SiO_2$, the ranges given in Table 2 for impurities satisfy the JIS requirements for Class 1 ferric oxide given in Table 3. The $SiO_2$ in ferric oxide which is manufactured from a waste pickling solution comes from the waste pickling solution when the roasting method is used, and it comes from the waste pickling solution and from a neutralizing agent when the neutralizing method is used. Accordingly, in order to obtain high-quality ferric oxide which satisfies the requirements for JIS Class 1 ferric oxide, it is necessary to reduce the content of silicon in the waste pickling solution as much as possible.

TABLE 2

| Composition of ferric oxide made by roasting of raw waste pickling solution (wt. %) | | | |
|---|---|---|---|
| $Fe_2O_3$ | $SiO_2$ | Al | Mn |
| ≧98.5 | 0.03-0.07 | 0.01-0.02 | 0.2-0.3 |

TABLE 3

| Composition of ferric oxide according to JIS K1462 (wt. %) | | | | | |
|---|---|---|---|---|---|
| Class | $Fe_2O_3$ | $SiO_2$ | Al | Mn | Ca |
| 1 | ≧99.0 | ≦0.01 | ≦0.02 | ≦0.30 | ≦0.01 |
| 2 | ≧98.8 | ≦0.06 | ≦0.02 | ≦0.30 | ≦0.02 |
| 3 | ≧98.5 | ≦0.30 | ≦0.05 | ≦0.30 | ≦0.04 |

Silicon exists in a waste pickling solution in the form of silicic acid ($SiO_2 \cdot nH_2O$). Various methods have been proposed for removing silicon from waste pickling solutions, and some of these methods have been put into practice.

For example, Japanese Published Examined Patent Application No. 61-289 (1986) discloses a method of reducing the silicon content of a waste pickling solution by ultrafiltration. However, as most of the silicic acid in a waste pickling solution immediately after pickling has a small particle diameter on the order of 20Å, only a small amount of silicic acid can be removed by ultrafiltration, and the efficiency of removal is poor.

Japanese Published Unexamined Patent Application No. 59-111930 (1984) discloses a method for reducing the amount of silicic acid in a waste pickling solution by contacting the waste pickling solution with silica gel and adsorbing the silicic acid on the silica gel. However, only a small amount of silicic acid is actually adsorbed by the silica gel, so the efficiency of removal is poor. Furthermore, it is difficult to reuse the silica gel, so processing costs are high.

Japanese Published Unexamined Patent Application No. 59-169902 (1984) discloses a method for reducing the silica content of a waste pickling solution in which the waste pickling solution is concentrated by being contacted with a high-temperature oxygen-containing gas, soluble silicic acid in the waste pickling solution in molecular or ionic form is made insoluble, and then filtration is performed. However, this method requires a concentrating apparatus and other large equipment, so equipment costs are high and operation is complicated.

Japanese Published Unexamined Patent Application No. 58-151335 (1983) discloses a method for removing silicon by adding a high polymer coagulant to a waste pickling solution. The silicic acid in the solution is made to coagulate and is then removed by filtration. However, the silicic acid in a waste pickling solution is extremely fine at first, so little coagulation can be expected. Furthermore, the polymer coagulant can produce an adverse effect because it covers the surface of active silicic acid particles, so the spontaneous coagulation of the silicic acid which will be described below in detail may be impeded.

Japanese Published Unexamined Patent Application No. 60-122087 (1985) discloses a method in which a surfactant is added to a waste pickling solution, and silicic acid is then removed by filtration. Although the surface of silicic acid in a waste pickling solution is initially hydrophilic, when it is covered with a surfactant, it becomes hydrophobic and easier to coagulate. On the other hand, if too much surfactant is present, the surface again becomes hydrophilic and defloculation occurs, so it is necessary to add the appropriate amount of a surfactant in order to maintain a state of coagulation. However, the waste pickling solution already contains a surfactant which was added at the time of pickling of steel stock in order to prevent excessive pickling, so it is difficult to control the amount of surfactant which is added to the solution. Furthermore, just as in the case in which a polymer coagulant is added, the addition of a surfactant reduces the activity of the surface of the silicic acid in the waste pickling solution which would normally make the particles of silicic acid join to one another. Therefore, spontaneous coagulation is impeded, and the silicic acid remains in the form of minute particles which are nearly impossible to separate by filtration.

SUMMARY OF THE INVENTION

Accordingly, it is an object of the present invention to provide a method for removing silicon from a waste pickling solution which is easy and inexpensive to perform.

It is another object of the present invention to provide a method of removing silicon from a waste pickling solution which is highly efficient.

It is still another object of the present invention to provide a method of removing silicon from a waste pickling solution which can efficiently remove silicon without the addition of an additive such as a surfactant or a coagulating agent and without the use of large equipment such as concentrating equipment.

A further object of the present invention is to provide a method for refining a waste pickling solution which can remove silicon by means of a conventional solid-liquid separating method such as filtration or centrifugation and which can manufacture ferric oxide which meets the requirements of JIS Class 1 ferric oxide.

As a result of investigation of the properties of waste pickling solutions, the present inventors made the following discoveries.

(1) If a waste pickling solution is left to stand for a period of time, the $SiO_2$ contained therein will polymerize, resulting in a floc of coagulated particles which grow to a final particle size of from 1 to several tens of micrometers. These particles can be easily separated from the waste pickling solution as a sludge by filtration or centrifugation.

(2) The spontaneous polymerization and coagulation of the particles is greatly promoted by stirring.

(3) The above-described sludge of $SiO_2$ particles which is obtained by separation is effective as an adsorbent or a coagulating agent for silicic acid in waste pickling solution. If the sludge is added to a waste pickling solution, the polymerization and coagulation of silicic acid is greatly promoted. This sludge is also effective as a filter medium for waste pickling solutions.

(4) The adsorbing and coagulating effect which is provided by the sludge is caused by minute particles of hydrophilic carbonaceous materials in the sludge.

The present invention is based on the above findings and utilizes the spontaneous coagulation of silicic acid in a waste pickling solution to form a sludge which can be easily removed from the waste pickling solution by conventional separating methods. The present invention also uses sludge which is separated from a waste pickling solution as an additive or as a filtering medium to promote the coagulation of silicic acid in a waste pickling solution.

In one aspect of the present invention, silicon is removed from a waste hydrochloric acid pickling solution by a method comprising stirring a waste hydrochloric acid pickling solution long enough to form a sludge of coagulated particles having an average particle diameter of at least 0.1 µm in the waste pickling solution without the presence of an additive, followed by separating solids from the waste pickling solution. The separation of solids is preferably performed either by filtration using a filter with an average pore size of at least 0.1 µm, by centrifugation, or by sedimentation.

In another aspect of the present invention, silicon is removed from a waste hydrochloric acid pickling solution by a method comprising adding an additive having hydrophilic functional groups to a waste hydrochloric acid pickling solution, stirring the waste hydrochloric acid pickling solution long enough to form a sludge of coagulated particles having an average particle diameter of at least 0.1 µm, and then separating solids from the waste pickling solution, preferably by filtration using a filter with an average pore size of at least 0.1 µm, by centrifugation, or by sedimentation. Some examples of an additive having hydrophilic functional groups are sludge which was separated from a waste pickling solution, and carbon black or acetylene black whose surface has been made hydrophilic by surface oxidation.

The present invention also resides in a method for removing silicon from a waste hydrochloric acid pickling solution for steel stock, comprising performing solid-liquid separation of a waste hydrochloric acid pickling solution for steel stock, forming the resulting solids into a layer, and filtering a waste hydrochloric acid pickling solution through the layer.

DESCRIPTION OF THE PREFERRED EMBODIMENTS

Silicon in a waste pickling solution is in the form of silicic acid, which is expressed by the general formula $SiO_2 \cdot nH_2O$. It comes from silicon contained in steel stock which is dissolved out of the steel stock together with iron during pickling. Therefore, the particles of silicic acid are extremely minute, and in a waste pickling solution, the surfaces thereof are covered with hydroxyl groups, so they are stabilized as minute particles. This is thought to be the reason why silicic acid can not be separated from a waste pickling solution by a conventional solid-liquid separating method such as filtration or centrifugation. If a waste pickling solution is centrifuged or filtered with an ultrafiltration membrane having an average pore diameter of 20Å within 24 hours of pickling, there is almost no decrease in the silicic acid content of the filtrate or the supernatant. It is known that silicic acid will polymerize in a strongly acidic solution, and that a silicic acid colloid having a particle diameter of several hundred Å is formed. However, particles of even this size are still too small to be separated by a conventional solid-liquid separating method such as by filtration with a usual filter or by centrifugation.

The present inventors observed that after a long period of time, the polymerization of silicic acid in a waste pickling solution greatly progresses, and eventually, the silicic acid particles grow to form a floc having a particle diameter of from 1 to several tens of $\mu m$ or even larger. Namely, at first, silicic acid exists in a waste pickling solution in the form of monosilicic acid [Si(OH)$_4$] having a particle diameter of several Å. In addition, a portion of the monosilicic acid dissociates to become silicic acid ions [Si(OH)$_6{}^{2-}$]. However, the silicic acid gradually polymerizes to become an insoluble silicic acid polymer. Within 24 hours of pickling, the majority of this silicic acid polymer has a particle diameter of at most 20Å, but polymerization progresses with the passage of time and the particles grow to the size mentioned above.

Figure 1:
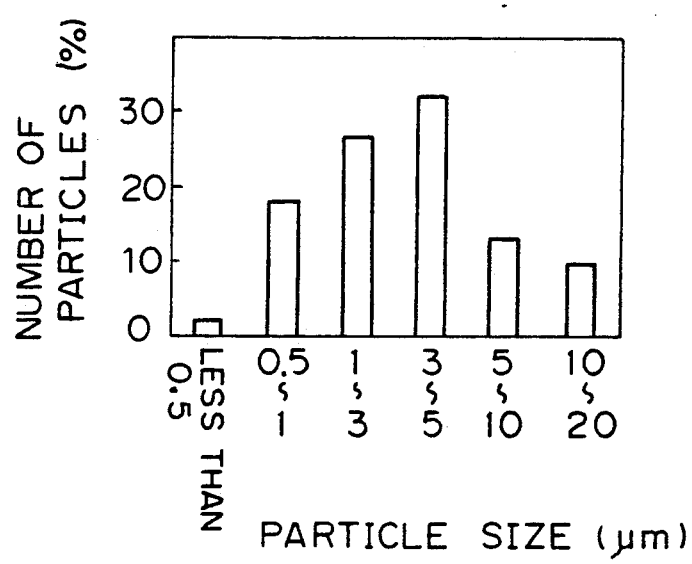
FIG. 1 is a bar graph showing the particle size distribution of sludge in a waste pickling solution 7 days after it had been used for pickling.

FIG. 1 shows the particle size distribution of sludge which was taken from the bottom of a tank containing waste pickling solution which was allowed to sit for 1 week after pickling. It can be seen that the majority of the particles had a diameter of at least 1 $\mu m$.

Figure 2:
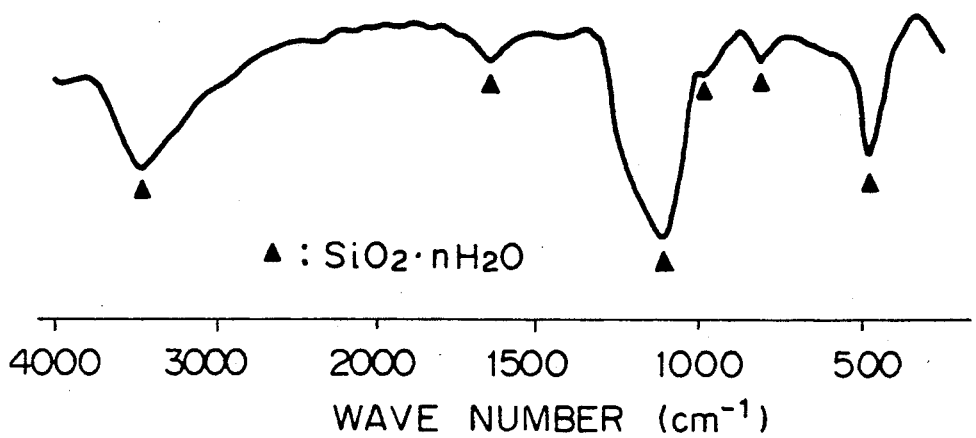
FIG. 2 is an infrared absorption spectrum of the sludge of FIG. 1.

Table 4 shows the composition of this sludge. The main component of the sludge was silicic acid (SiO$_2$), and the next major component was carbon (C) which dissolved out of the steel stock. FIG. 2 shows the infrared absorption spectrum of this sludge, in which absorption by SiO$_2 \cdot n$H$_2$O can be clearly seen.

TABLE 4

| Composition of sludge separated from waste pickling solution after aging for 1 week (wt. %) | | | | |
|---|---|---|---|---|
| SiO$_2$ | H$_2$O | C | Al$_2$O$_3$ | Fe |
| 45–85 | 2–6 | 2–25 | 1–8 | 0–4 |

It is hypothesized that the reason that polymerization of silicic acid in a waste pickling solution progresses over time is primarily the presence of C in the waste pickling solution. Namely, when particles of C dissolve out from the steel stock, the C particles have hydrophilic carboxyl groups on the surface thereof which are formed by the oxidation of the surfaces of the C particles. Therefore, the C particles have affinity for silicic acid particles which have hydroxyl groups on the surface thereof. Furthermore, the zeta potential (electrokinetic potential) of the C particles is minus (negative), so they reduce the potential of the silicic acid particles which have a positive zeta potential. This acts to reduce the electrical repulsion between silicic acid particles.

The following formulas represent the mechanism by which silicic acid (monosilicic acid and disilicic acid) coagulates in a waste pickling solution. The surface charge of the silicic acid particles and the carbon particle, and the hydrophilic groups on the surface of the carbon particle have been omitted.

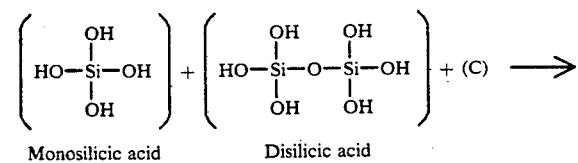

Monosilicic acid     Disilicic acid

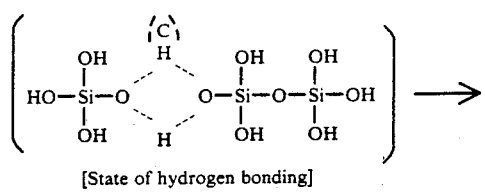

[State of hydrogen bonding]

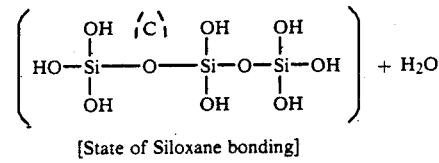

[State of Siloxane bonding]

As shown by the above formula, the hydroxyl groups of monosilicic acid and disilicic acid are joined to one another by hydrogen bonding. In this state of hydrogen bonding, the C particles lower the zeta potential of the silicic acid particles and the electrical repulsion between the silicic acid particles is decreased. Then, as a result of a dehydration reaction, the state of hydrogen bonding changes to a more stable state of siloxane bonding. The speed of the dehydration reaction increases as the temperature of the waste pickling solution increases. By the repetition of this process, silicic acid is polymerized and gradually coagulates.

The coagulated particles which form the sludge mainly comprise a silicic acid polymer which is formed in the above-described manner and have a large specific surface area. Furthermore, they have hydrophilic functional groups such as the hydroxyl groups of silicic acid or the carboxyl groups of C particles on their surfaces, and these groups easily bond to the hydroxyl groups of silicic acid. Therefore the coagulated particles adsorb C particles and minute insoluble silicic acid particles in the waste pickling solution which have not coagulated. The silicic acid which is adsorbed is bonded to the coagulated particles by the above polymerization reaction and becomes a part of the coagulated particles, resulting in a further growth in particle size. Accordingly, coagulation of silicic acid particles progresses due to both the polymerization of silicic acid and to adsorption by coagulated particles.

When a waste pickling solution is left to stand, at least 7 days are necessary in order for silicic acid in the solution to coagulate into particles having a particle diameter of at least 1 $\mu m$. However, it was found that coagulation of the silicic acid is greatly promoted if the waste pickling solution is stirred. Stirring the waste pickling solution increases the probability of contact between silicic acid particles as well as between silicic acid particles and carbon particles, and as a result, both polymerization and adsorption progress rapidly. However, if the stirring is too vigorous, the above-described state of hydrogen bonding is destroyed, and the coagulation of silicic acid is impeded.

When a waste pickling solution is stirred, the amount of fine silicic acid particles rapidly decreases at the start of stirring. If the stirring is performed for less than 24 hours, the particle diameter of the coagulated solids increase to no more than 20Å. However, if stirring is continued for at least 24 hours, the particle size increases to a size of greater than 20Å, and particles of this size can be separated by ultrafiltration. If stirring is continued for 3 days or more, coagulation proceeds still further, and the average particle diameter of the silicic acid particles increases to at least 0.1 μm and generally to around 1 μm. Particles of this size can be easily separated by a conventional solid-liquid separating method. As a result of the coagulation, the $SiO_2$ content of the waste pickling solution in terms of the "converted $SiO_2/Fe_2O_3$ weight ratio" falls to 0.01% or below, and thus the level of at most 0.01% of $SiO_2$ of Table 3 which is prescribed for JIS Class 1 ferric oxide can be satisfied.

The "converted $SiO_2/Fe_2O_3$ weight ratio" is the ratio, expressed as a %, of the weight of $SiO_2$ in a waste pickling solution to the weight of $Fe_2O_3$ which could be obtained from the solution. The weight of $Fe_2O_3$ is calculated based on the amount of Fe in the waste pickling solution. The converted $SiO_2/Fe_2O_3$ weight ratio of the waste pickling solution approximates the $SiO_2$/ferric oxide ratio in ferric oxide which is manufactured from the waste pickling solution by roasting. If the converted $SiO_2/Fe_2O_3$ weight ratio is at most 0.01%, ferric oxide having an $SiO_2$ content of at most 0.01 weight % can be obtained.

Accordingly, after a waste pickling solution has been stirred for a period of time, the solids therein can be easily separated by filtration using a filter having an average pore size of at least 0.1 μm, by centrifugation, or by sedimentation, whereby a waste pickling solution can be obtained which has a low silicon content and which is therefore suitable for use as a raw material for the manufacture of high-quality ferrite.

In the above-described mechanism whereby silicic acid is polymerized and coagulated, silicic acid ions $[Si(OH)_6^{2-}]$ which are formed by the dissociation of silicic acid do not contribute to the coagulation mechanism, nor are they adsorbed by the sludge which is formed by coagulation. Therefore, they remain in the waste pickling solution and can not be removed by the method of the present invention. Thus, in the present invention, the lower limit on the silicon content of the waste pickling solution after solid-liquid separation depends on the solubility of the silicic acid. However, the solubility (converted $SiO_2/Fe_2O_3$ weight ratio) is approximately 0.004% near room temperature, so the silicic acid which is dissolved in the waste pickling solution is only a minute portion of the total amount of silicon. Therefore, even if silicic acid ions remain in the waste pickling solution, the waste pickling solution is still satisfactory for use in the manufacture of JIS Class 1 ferric oxide.

The length of time for which stirring is performed should be long enough to form a sludge whose particles have a size such that the sludge can be separated by a conventional solid-liquid separation method such as filtration or centrifugation. Namely, it should be performed long enough to form a sludge having an average particle diameter of at least 0.1 μm. As mentioned above, it generally requires at least three days of stirring to obtain particles of this size, but the length of time varies in accordance with the composition of the waste pickling solution and the stirring conditions. Normally, stirring for longer than 10 days produces no significant further decrease in the silicon content of a waste pickling solution after solid-liquid separation is performed. Therefore, stirring is normally performed for about 3-7 days.

Any conventional stirring method can be employed. However, as mentioned earlier, if the stirring is too vigorous, the coagulation of the silicic acid is impeded. Therefore, if an impeller is used for stirring, the impeller speed is preferably at most approximately 200 rpm, as a general rule. If stirring is performed by gas bubbling, a gas flow rate of approximately 0.1-1 $Nm^3$/min for each $m^3$ of waste pickling solution is preferable. The stirring is preferably carried out in an inert atmosphere such as a nitrogen atmosphere.

The temperature of the waste pickling solution during stirring is perferably 25°-80° C. and more preferably is 40°-60° C. If the solution temperature is too low, coagulation of silicic acid progresses slowly, and a long stirring time is required. As the temperature increases, the coagulation of the silicic acid is promoted, but at the same time, the solubility of silicic acid also increases, so the amount of silicic acid ions which dissolve in the solution and which can not be removed by the method of the present invention increases. With a solution temperature of 80° C. or above, the solubility of silicic acid in terms of the converted $SiO_2/Fe_2O_3$ weight ratio becomes about 0.01%. Therefore, if the solution temperature during stirring is 80° C. or above, it becomes difficult to obtain a waste pickling solution which meets the requirements for manufacture of JIS Class 1 ferric oxide using the present method.

After the waste pickling solution is stirred in the above-described manner so as to obtain coagulated silicic acid having an average particle diameter of at least 0.1 μm and perferably at least 1 μm, the resulting sludge is separated by filtration, centrifugation, or sedimentation. As a result, the majority of silicon is removed from the waste pickling solution, and the resulting waste pickling solution is suitable for the manufacture of ferric oxide for high-quality ferrite.

When the sludge is removed from the waste pickling solution by filtration, a filter having an average pore diameter of at least 0.1 μm is used. If the average pore diameter is less than 0.1 μm, the filter will frequently become clogged, and the filtration pressure will increase. From the standpoint of ease of filtering, the average pore diameter of the filter is preferably 1-5 μm. Filtration can be easily performed in two stages by first removing the sludge using a filter with an average pore diameter of approximately 5 μm and then filtering the resulting filtrate with a filter having an average pore diameter on the order of 1 μm. The efficiency of cleaning the filter can be improved by employing a filter which can be backwashed.

If the sludge is removed from the waste pickling solution by centrifugation, it is possible to perform solid-liquid separation in a short length of time using a compact apparatus, and there is no problem with clogging of pores as in filtration. Centrifugation can be performed batch-wise or continuously. When separation is performed by centrifugation, the silicic acid in the waste pickling solution is first made to coagulate until the average particle diameter is at least 0.1 μm. If the average particle diameter is less than this size, separation by centrifugation becomes difficult due to equipment limitations.

When separation is performed by sedimentation, the waste pickling solution is left to stand until the sludge undergoes spontaneous sedimentation, after which the supernatant can be recovered. Alternately, the waste pickling solution can be made to flow vertically and upwardly at a rate which is lower than the final sedimentation speed of the sludge and a clear waste pickling solution can be obtained.

As mentioned previously, the sludge which is separated from a waste pickling solution by the method of the present invention is the result of coagulation of minute silicic acid and carbon particles, so it has a large specific surface area Furthermore, on its surface it has hydrophilic functional groups which can easily bond to silicic acid particles, such as the hydroxyl groups of silicic acid particles and the carboxyl groups of carbon particles. Therefore, it adsorbs and coagulates minute silicic acid and carbon particles which are present in the waste pickling solution. As a result of this property, the coagulation of silicic acid in a waste pickling solution is greatly promoted if such a sludge is added to the waste pickling solution and stirring is performed. Namely, it is thought that coagulation is promoted by the adsorption of minute silicic acid particles in the waste pickling solution by the sludge which is added, and the adsorbed particles themselves become part of the sludge due to a polymerization reaction.

Accordingly, in accordance with one embodiment of the present invention, a sludge which is obtained by solid-liquid separation of a waste pickling solution is added to a waste pickling solution, stirring is performed until coagulated particles having an average particle diameter of at least 0.1 μm are formed, and then the solids are separated from the solution in the previously-described manner, as a result of which silicon is removed from the waste pickling solution.

When no sludge is added to a waste pickling solution, it requires 3-7 days of stirring in order to obtain silicic acid particles having an adequate particle diameter. In contrast, when sludge is added, solid-liquid separation can be performed after only 1-3 days of stirring, although the length of time depends on the amount of sludge which is added.

The sludge which is added to a waste pickling solution can be sludge which is obtained by solid-liquid separation of a waste pickling solution by filtration or centrifugation after stirring in the above-described manner. For second and subsequent treatments, the sludge which is formed during the preceding treatment can be employed. Accordingly, it is necessary to obtain sludge for addition from outside the treatment system only for the first treatment. An example of sludge which can be used for the first treatment is sludge which is separated from a waste pickling solution which has been left to stand in a storage tank for at least 7 days after pickling. Of course, sludge which is formed by letting a waste pickling solution stand for a length of time can also be used for the second and subsequent treatments.

A certain amount of effect can be obtained if the amount of sludge which is added to the waste pickling solution is at least 0.1 g dry weight per liter of solution. However, in order to reduce the amount of dissolved silicic acid in the waste pickling solution to a level such that the converted $SiO_2/Fe_2O_3$ weight, ratio is at most 0.01% as required for JIS Class 1 ferric oxide with stirring being performed for only a short length of time, it is preferable that the amount of sludge which is added be at least 0.5 g dry weight per liter. However, no significant further improvement is obtained by adding greater than 10 g per liter. Furthermore, the load during solid-liquid separation increases as the amount of sludge increases. Accordingly, the amount of sludge which is added to the waste pickling solution is 0.1-10 g dry weight per liter and preferably 0.5-10 g dry weight per liter.

After the addition of sludge, the waste pickling solution is stirred in the manner described previously. The stirring is extremely effective for promoting the adsorption by the sludge of minute silicic acid and carbon particles within the waste pickling solution, resulting in increased coagulation. After the silicic acid has been adequately coagulated by stirring, the sludge is separated from the waste pickling solution by a conventional method such as filtration with a filter having an average pore diameter of at least 0.1 μm, centrifugation, or sedimentation in the same manner as described previously. A waste pickling solution having a greatly reduced silicon content is thereby obtained.

The ability to promote polymerization of silicic acid which is exhibited by the sludge which is obtained from the solids of a waste pickling solution is largely due to the carbon particles which are present in the sludge in a small quantity and which have hydrophilic functional groups such as carboxyl groups on the surfaces thereof. Accordingly, instead of adding the sludge to a waste pickling solution, it is possible to promote the polymerization and coagulation of silicic acid by adding to the waste pickling solution a carbonaceous material which has hydrophilic functional groups on its surface. Namely, a material which is added to the waste pickling solution in order to promote polymerization and coagulation is not restricted to sludge which has been separated from a waste pickling solution, and any carbonaceous material having hydrophilic functional groups (carboxyl groups, hydroxyl groups, etc.) on the surface thereof can be employed.

Preferable examples of such a carbonaceous material are carbon black or acetylene black whose surface has been modified so as to be hydrophilic. The modified carbon black or modified acetylene black can be either in the form of a fine powder or granules formed from a fine powder. The finer the particle size of the powder the greater is the surface area for contact with silicic acid in the waste pickling solution. However, taking into consideration ease of removing solids after stirring, a particle size of approximately 0.1-1 μm is suitable.

The carbonaceous material is preferably added to the waste pickling solution in an amount of 5-50 ppm. If the concentration is less than 5 ppm adequate promotion of polymerization can not be achieved, while the effect of addition of the carbonaceous material stops increasing when the concentration exceeds 50 ppm. However, when the waste pickling solution is stirred for a short period of less than 48 hours after addition of the carbonaceous material, it is preferable that the concentration be at least 10 ppm. On the other hand, if stirring is performed for more than 72 hours, polymerization is promoted even when the concentration is less than 5 ppm. Thus, the amount of a carbonaceous material which is added is far less than the amount of sludge which would need to be added to obtain the same effect. This is because sludge contains only a small amount of carbon which is largely responsible for promotion of polymerization, so it is necessary to add a large quantity of sludge to obtain the desired effect. Since only a small amount of a carbonaceous material need be added, its use as an additive has the advantage that the load on the sludge separator which is employed for solid-liquid separation after stirring is decreased.

The surface of a carbonaceous material such as carbon black and acetylene black is generally hydrophobic, so in order to adequately disperse it in a waste pickling solution and cause it to promote the polymerization of silicic acid, it is necessary to make its surface hydrophilic. This can be done by providing the surface of the carbonaceous material with hydrophilic functional groups such as hydroxyl groups, carboxyl group, carbonyl groups, or lactone groups. The surface can be made hydrophilic by surface oxidation such as liquid phase oxidation or vapor phase oxidation in which hydrophilic functional groups are introduced to the surface of the carbonaceous material. Liquid phase oxidation can be performed by treatment with an aqueous solution of an oxidizing acid or its salt such as nitric acid, hydrogen peroxide, potassium permanganate, sodium chlorate, or sodium perchlorate. Vapor phase oxidation can be performed by oxidation using oxygen, ozone, dry or moist air, combustion gas, and the like.

It was found that the sludge which is obtained by solid-liquid separation of a waste pickling solution is useful as a filter medium for the filtration of a waste pickling solution. Namely, if the sludge is formed into a layer and a waste pickling solution is passed through therethrough, the sludge layer can remove silicic acid from the waste pickling solution by filtration. When performing separation by this method, it is not necessary to stir the waste pickling solution prior to filtration in order to cause the polymerization and coagulation of the silicic acid. Namely, a waste pickling solution containing fine particles of silicic acid requires no pretreatment before being filtered by a sludge layer. The silicic acid in the waste pickling solution is adsorbed by the sludge layer and removed from the solution, and a filtrate having a decreased silicon content is obtained.

Figure 3:
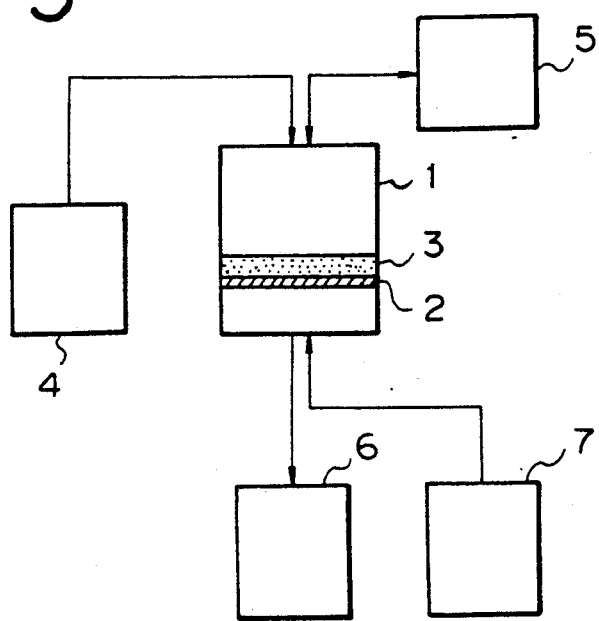
FIG. 3 is a block diagram of an apparatus for filtration treatment of a waste pickling solution using a layer of sludge obtained from a waste pickling solution.

FIG. 3 is a block diagram of an apparatus for carrying out the method of the present invention. A filter housing 1 is provided with a filter membrane 2 disposed inside the housing. A sludge layer 3 which was separated from a waste pickling solution is disposed atop the filter membrane 2. The sludge layer 3 functions as a filter medium. Above the sludge layer 3, the filter housing 1 is connected to a waste pickling solution tank 4 and a sludge storage tank 5. Beneath the sludge layer 3, the filter housing 1 is connected to a filtrate tank 6 and a backwash tank 7. The illustrated components together constitute a filtering apparatus.

The filter membrane 2 is provided in order to prevent the sludge layer 3, which contains a large amount of silicic acid, from contaminating the filtrate. A filter plate can be used instead of the filter membrane 2. In either case, a suitable average pore diameter is on the order of 1-5 μm. However, even if the average pore diameter of the filter membrane or plate is greater than 5 μm, sludge can be prevented from entering the filtrate by applying a coating or a layer of a suitable filter aid to the filter membrane or plate and forming the sludge layer atop the filter aid. Examples of a suitable filter aid are siliceous materials such as silica gel, diatomaceous earth, and silicic acid. A particle size which is on the order of the average pore diameter of the filter membrane or plate is suitable.

The sludge layer 3 which is formed atop the filter membrane 2 can be separated from a waste pickling solution in the previously described manner. Namely, after a waste pickling solution has been aged in order to promote the polymerization and coagulation of silicic acid, either by letting the waste pickling solution stand for at least 7 days or else by stirring it for at least 3 days, the sludge which has sunk to the bottom of the waste pickling solution can be removed, or the sludge can be separated from the waste pickling solution by a suitable solid-liquid separating method. It has been found that when a waste pickling solution is left to stand, after 24 hours approximately 1 mg of sludge per liter of solution is formed, and after 7 days, approximately 100 mg of sludge per liter of solution are formed. The formation of sludge is promoted by stirring, and the lower the aging temperature, the greater is the amount of sludge which is produced.

The thickness of the sludge layer 3 is not critical, but it is perferable to restrict the linear speed of filtration (the distance which the waste pickling solution penetrates through the sludge layer 3 per unit time) as follows.

Figure 4:
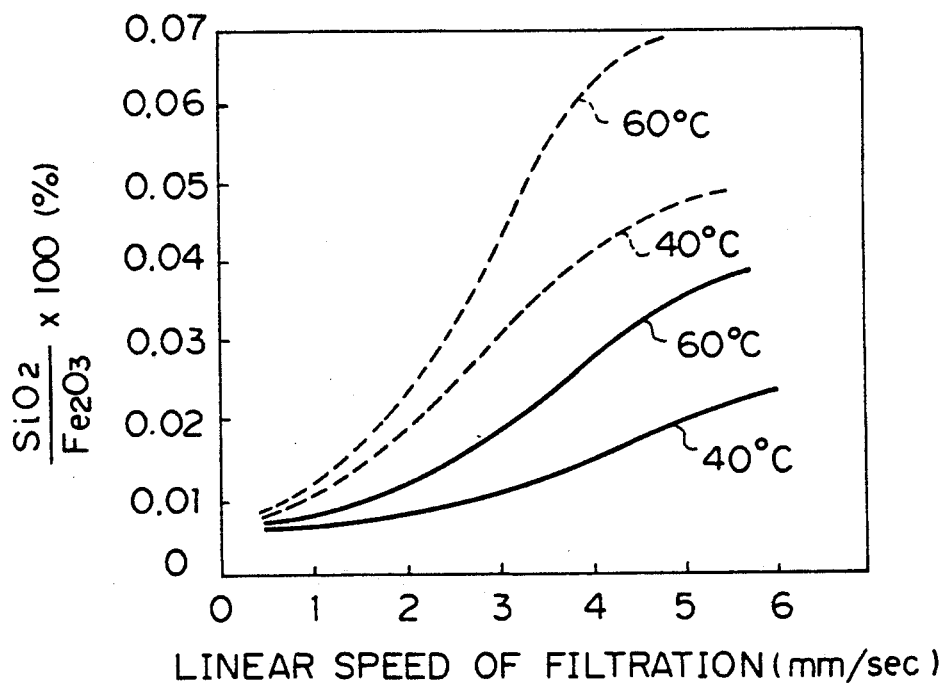
FIG. 4 is a graph of the relationship between the $SiO_2$ content of a filtrate and the linear speed of filtration in the filtration treatment performed by the apparatus of FIG. 3.

FIG. 4 shows the relationship between the linear speed of filtration of a waste pickling solution on the abscissa and the converted $SiO_2/Fe_2O_3$ weight ratio of the resulting filtrate. In this figure, the solid lines are for a waste pickling solution with an $SiO_2$ content of 0.04 weight %, and the dashed lines are for a waste pickling solution with an $SiO_2$ content of 0.07 weight %. It can be seen that when the $SiO_2$ content of the waste pickling solution is 0.04 weight %, in order to lower the $SiO_2$ content of the filtrate to at most 0.01 weight % as required for JIS Class 1 ferric oxide, the linear speed of filtration must be at most about 3 mm/sec when the temperature of the waste pickling solution is 40° C. and must be at most about 1.5 mm/sec when the temperature is 60° C. When the waste pickling solution contains 0.07 weight % of $SiO_2$, the linear speed of filtration must be at most about 1 mm/sec at 40° C. and still lower at 60° C. By adjusting the linear speed of filtration in accordance with the $SiO_2$ content and the temperature of the waste pickling solution, a filtrate having a desired $SiO_2$ content can be obtained. The higher the temperature of the waste pickling solution during treatment and the higher the $SiO_2$ content thereof, the lower must be the linear speed of filtration.

When using the apparatus of FIG. 3 to treat a waste pickling solution, sludge which is obtained from a waste pickling solution in the above-described manner is placed into the sludge storage tank 5 for storage. It is then poured into the filter housing 1 to form a sludge layer 3 atop the filter membrane 2. Next, a waste pickling solution is poured into the filter housing 1 from the waste pickling solution tank 4, the waste pickling solution is passed through the sludge layer 3 and the filter membrane 2 at a suitable linear speed of filtration, and the resulting filtrate is collected in the filtrate tank 6.

When it becomes difficult for liquid to pass through the filter membrane 2 and the sludge layer 3 due to clogging, water is introduced into the filter housing 1 from the backwash tank 7, and the sludge layer 3 is forced to remove from the filter membrane 2 and formed into a slurry. This slurry is temporarily returned to the sludge storage tank 5, and then sludge is again poured over the filter membrane 2 to reform the sludge layer 3. In this manner, the same sludge can be used repeatedly.

Any of the above-described methods for treating a waste pickling solution can reduce the silicon content in terms of the converted $SiO_2/Fe_2O_3$ weight ratio to 0.01% or below. In accordance with the present invention, silicon can be inexpensively and efficiently removed from a waste pickling solution by a solid-liquid separation method such as centrifugation or filtration. After this treatment, ferric oxide suitable for high-quality ferrite can be obtained by a roasting method or a neutralization method.

The present invention will be described in further detail by the following examples. These examples are given merely for the purpose of illustration, and they are not intended to limit the scope of the present invention in any way. In these examples, unless otherwise indicated, all the percents are by weight, and the silicic acid content (indicated as $SiO_2$ content) of a waste pickling solution means the above-described converted $SiO_2/Fe_2O_3$ weight ratio.

Examples 1 and 2 illustrate the effects on coagulation of silicic acid produced by stirring of a waste pickling solution.

EXAMPLE 1

Two waste pickling solutions having $SiO_2$ contents of 0.04% and 0.07%, respectively, were obtained by pickling of steel plates. Immediately after pickling, the solutions were maintained for 30 days at 60° C., either with or without stirring being performed. The solutions were periodically sampled during the 30 days. The samples were filtered and the $SiO_2$ content of the resulting filtrate was determined. Table 5 shows the $SiO_2$ content of the waste pickling solutions immediately after pickling as well as the stirring conditions. Stirring was performed using an impeller under a nitrogen atmosphere. The samples were filtered using a filter with an average pore diameter of 1 μm.

TABLE 5

| Run No. | $SiO_2$ Content of Waste Pickling Solution Immediately After Pickling (Converted $SiO_2/Fe_2O_3$ weight ratio) | Stirring Conditions (rpm) |
| --- | --- | --- |
| 1 | 0.07 | 50 |
| 2 | 0.04 | 50 |
| 3 | 0.07 | 0 |
| 4 | 0.04 | 0 |

Figure 5:
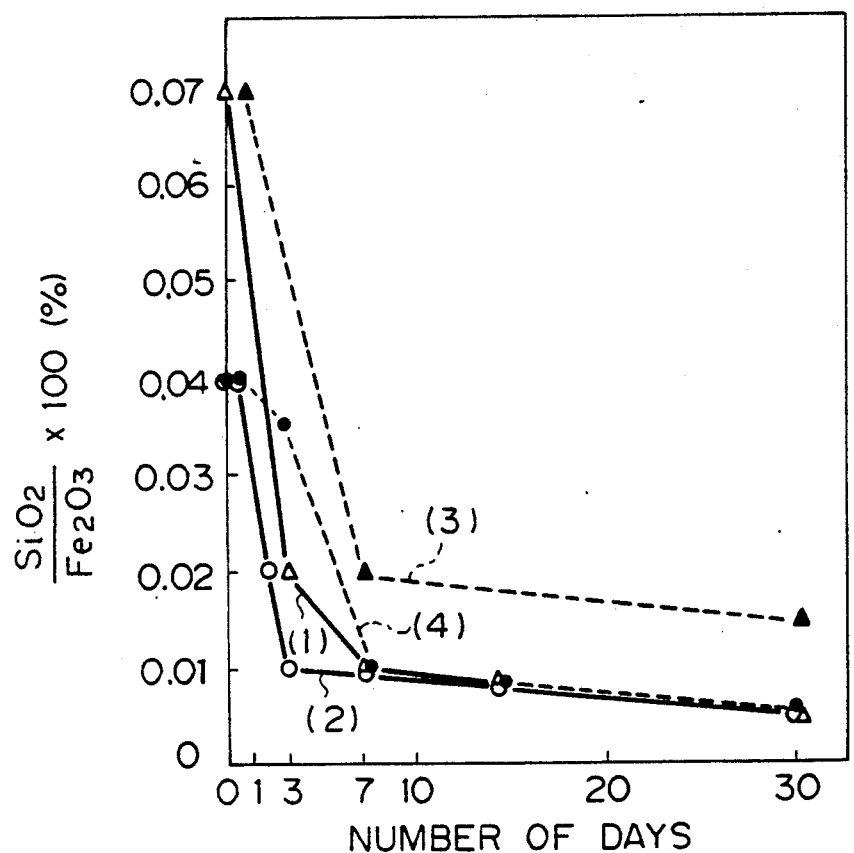
FIG. 5 is a graph of the relationship between the $SiO_2$ content of the filtrate and time for when a waste pickling solution was left to stand and for when it was stirred.

FIG. 5 shows the relationship between the number of days the solutions were kept at 60° C. and the silicic acid content of the filtrates. As shown in this figure, when a waste pickling solution was aged while stirring in accordance with the present invention and then filtered, the silicic acid content of the filtrate rapidly decreased from the start of stirring, and after the passage of two days (48 hours), the silicic acid content of the waste pickling solution fell to less than half its initial level for both solutions. When stirring was continued still longer, the silicic acid content of the filtrate of the solution with an initial silicic acid content of 0.04% (Run No. 2) fell to 0.01% on the third day, while the filtrate of the solution with an initial silicic acid content of 0.07% (Run No. 1) reached this level on the seventh day. Both filtrates were of a quality suitable for use in the manufacture of JIS Class 1 ferric oxide. For Run Nos. 3 and 4 in which the waste pickling solutions were maintained at 60° C. without stirring, the $SiO_2$ content of the filtrates decreased gradually instead of rapidly as when stirring was performed, and for the waste pickling solution with a starting $SiO_2$ content of 0.07%, even after 30 days, the $SiO_2$ content of the filtrate was relatively high.

EXAMPLE 2

A waste pickling solution having an $SiO_2$ content of 0.05% was obtained by pickling steel plates. Immediately after pickling, it was stirred by gas bubbling in which nitrogen gas was blown into the solution at a speed of 0.1 Nl per minute per liter of solution. Bubbling was performed for 5 days with the solution maintained at 60° C. Next, the waste pickling solution was filtered using a filter which could be backwashed and which had an average pore diameter of 1 μm. The $SiO_2$ content of the resulting filtrate (a) was 0.007%. This filtrate (a) was then filtered by an ultrafiltration membrane having an average pore diameter of 20 Å. The $SiO_2$ content of the resulting filtrate (b) was the same value (0.007%) as for filtrate (a). Filtrates (a) and (b) were each formed into ferric oxide by spray roasting. Each filtrate produces ferric oxide which had an average particle diameter of 1 μm and which was of a high quality suitable for soft ferrite.

From these results, it was found that when stirring is performed by gas bubbling, an adequate gas flow rate is 0.1 volumes of gas per minute per each volume of waste pickling solution. It was also found that the fine $SiO_2$ particles in the waste pickling solution coagulated to a size such that they could be separated by a filter with an average pore diameter of 1 μm.

Examples 3-6 which follow illustrate treatment by stirring a waste pickling solution to which has been added a sludge obtained from a waste pickling solution.

EXAMPLE 3

Figure 6:
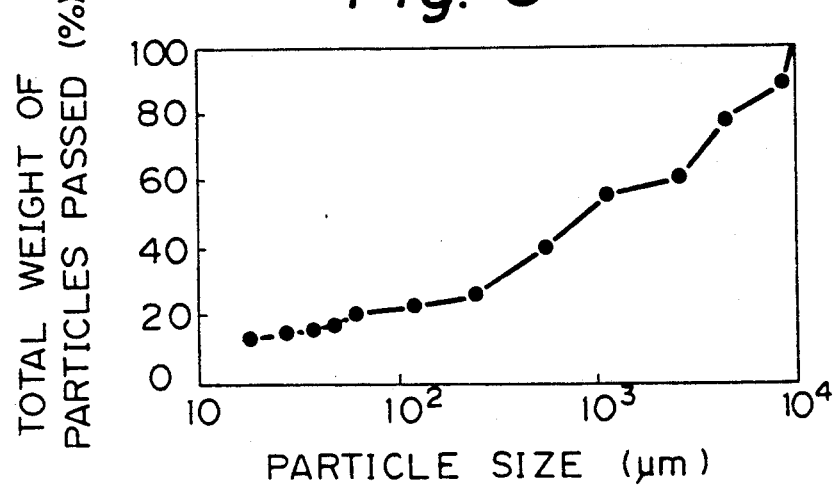
FIG. 6 is a graph of the particle size distribution of sludge in a waste pickling solution 60 days after it was used for pickling.

A waste pickling solution which was formed by pickling steel plates was left to stand in a tank for 60 days to coagulate silicic acid. Sludge which was removed from the bottom of the tank had the particle size distribution shown in FIG. 6. Coarse particles having a particle diameter of greater than 1 mm were removed from the sludge, after which the sludge was mixed in varying proportions with a separate waste pickling solution which had just been formed and which had an $SiO_2$ content of 0.04%. The mixture was stirred in a nitrogen atmosphere with an impeller at 50 rpm while being maintained at 60° C. for a prescribed length of time, after which it was filtered with a membrane filter having an average pore diameter of 1 μm and the $SiO_2$ content of the filtrate was determined. Table 6 shows the amount of sludge which was added to the waste pickling solutions in terms of dry weight and the stirring conditions.

TABLE 6

| Run No. | Amount of Sludge Added (Dry Weight/liter of solution) | Stirring Conditions |
| --- | --- | --- |
| 1 | 0.5 g/l | No stirring |
| 2 | — | 50 rpm |
| 3 | 0.1 g/l | 50 rpm |
| 4 | 0.5 g/l | 50 rpm |
| 5 | 10 g/l | 50 rpm |

Figure 7:
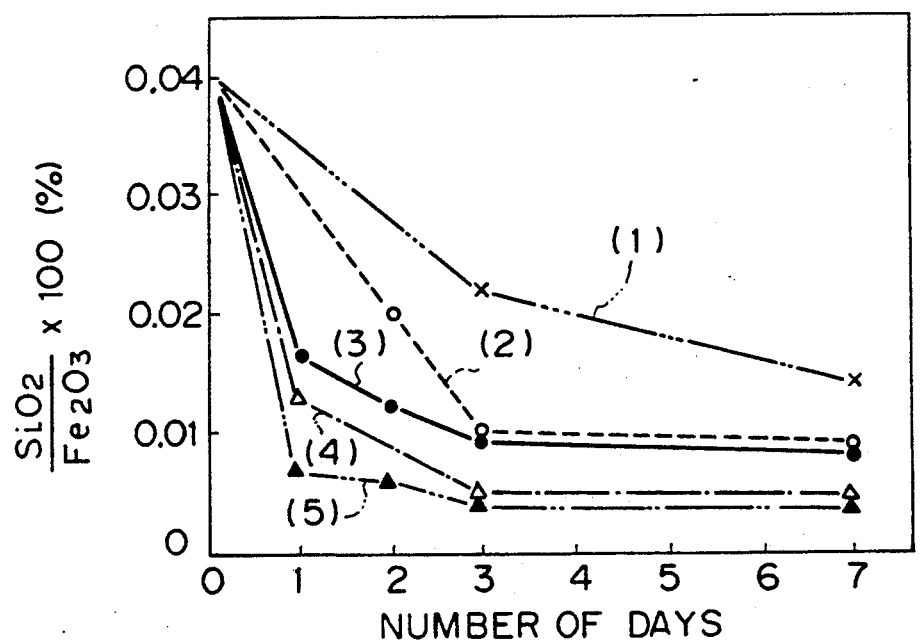
FIGS. 7-10 are graphs of test results of examples of the present invention.

FIG. 7 shows the relationship between the number of days after addition of the sludge and the $SiO_2$ content of the filtrate. From this figure, it can be seen that compared to Run No. 2 in which stirring was performed without the addition of sludge, a much faster decrease in the $SiO_2$ content of the waste pickling solution was experienced from Run Nos. 4 and 5 in which stirring was performed after the addition of 0.5 g/l and 10 g/l of sludge, respectively. Furthermore, an $SiO_2$ content of at most 0.01% which is necessary for the production of JIS Class 1 ferric oxide was reached after 1-2 days. Fairly good results were also obtained in No. 3 in which 0.1 g/l of sludge were added, and an $SiO_2$ content of at most 0.01% was reached on the third day, but the results were inferior to those for Run Nos. 4 and 5. In Run No. 1 in which 0.5 g/l of sludge were added but no stirring was performed, the coagulation of silicic acid was extremely slow, and the $SiO_2$ content of the filtrate was higher than that for even Run No. 2 in which no sludge was added.

EXAMPLE 4

A waste pickling solution which was just obtained by pickling steel plates and which had an $SiO_2$ content of 0.05% was placed into a waste pickling solution tank. Sludge like that used in Example 3 was added to the waste pickling solution in an amount of 1.0 g dry weight per liter of solution. While the solution temperature was maintained at 60° C., stirring was performed for 3 days by blowing nitrogen gas into the solution from the bottom of the tank at a rate of 0.1 Nl/min per liter of solution. Sludge was then removed from the solution using a filter membrane having an average pore diameter of 5 μm and a clear filtrate was obtained. The filtrate was then formed into ferric oxide ($Fe_2O_3$) by spray roasting at 600° C. The resulting ferric oxide was analyzed and was found to have an $SiO_2$ content of 0.008%. It thus fully satisfied the requirement for JIS Class 1 ferric oxide.

EXAMPLE 5

In this example, a waste pickling solution which was obtained by pickling of steel plates and which had an $SiO_2$ content of 0.04% was employed. The waste pickling solution was divided into two portions. One portion was stirred without the addition of any sludge. The other portion was stirred after the addition thereto of the same type of sludge as for Example 3 in an amount of 1.0 g dry weight per liter of solution. For both portions, stirring was performed for 3 days in a nitrogen gas atmosphere by an impeller rotating at 50 rpm with the solution maintained at 60° C.

Figure 8:
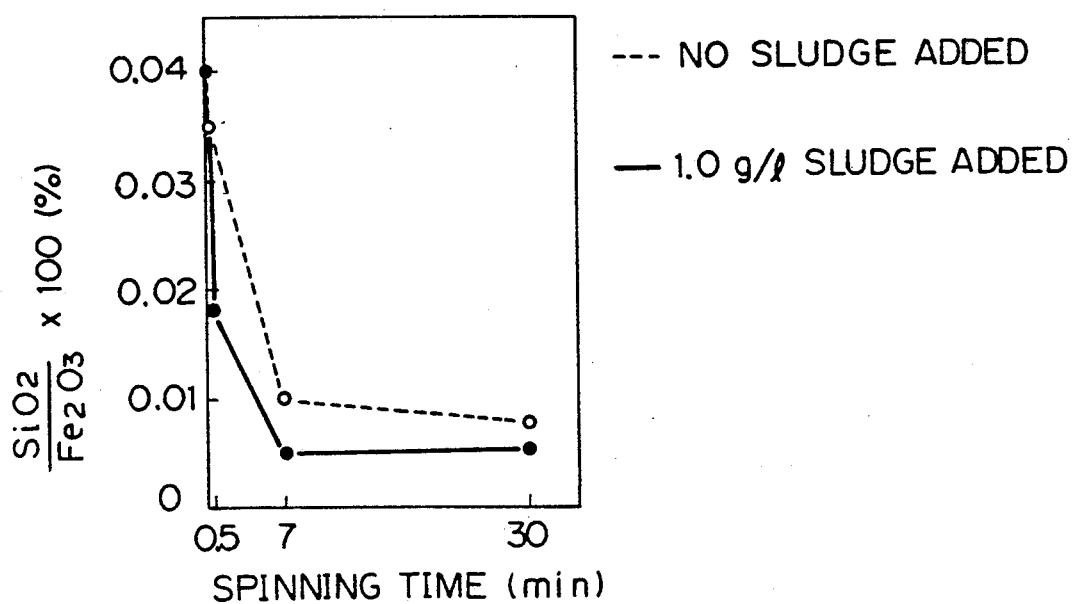

After three days of stirring, the sludge which was formed in the solutions was separated by spinning for a prescribed length of time in a batch centrifuge, and waste pickling solution having a decreased $SiO_2$ content was recovered. FIG. 8 shows the relationship between the $SiO_2$ content of the waste pickling solution after filtration and the spinning time. The speed of the centrifuge was such that the centrifugal force was 2400 g's. The centrifugal force is given by $r\omega^2$, wherein r is the radius of rotation and $\omega$ is the angular velocity.

As is clear from FIG. 8, both for the portion to which sludge was added and for the portion to which no sludge was added, sludge could be adequately separated after spinning for a short time of about 7 minutes, and a waste pickling solution with a reduced silicic acid content could be obtained. The portion to which sludge was added before centrifugation had a lower silicon content after centrifugation than did the other portion.

EXAMPLE 6

A pickling solution which had an $SiO_2$ content of 0.067% was obtained by pickling steel plates. Sludge like that used in Example 3 was added to the waste pickling solution in an amount of 0.5 g dry weight per liter of solution. The solution was then maintained in a nitrogen gas atmosphere at 60° C. for three days while being stirred with an impeller at 50 rpm.

After 3 days of stirring, the sludge which was formed was separated using a continuous centrifuge, and a waste pickling solution with a reduced $SiO_2$ content was obtained. The rate of treatment of the waste pickling solution was 1000 m³ per month, and the average time required for separation in the centrifuge was 7 minutes. The centrifuge had a bore of 500 mm in diameter and an axial length of 1.4 m.

Figure 9:
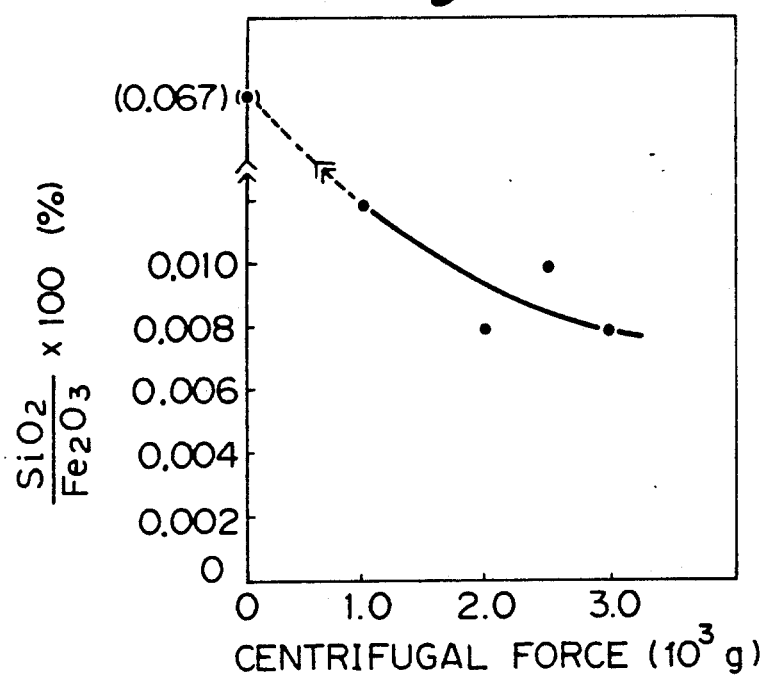

FIG. 9 shows the relationship between the centrifugal force in $10^3$ g's and the $SiO_2$ content of the waste pickling solution after separation of sludge. When the centrifugal force was above approximately 2400 g's (approximately 3000 rpm), the $SiO_2$ content of the waste pickling solution could be reduced to 0.01% or less.

Examples 7 and 8 which follow illustrate treatment by adding a carbonaceous materials having hydrophilic functional groups on its surface to a waste pickling solution followed by stirring.

EXAMPLE 7

A waste pickling solution having an $SiO_2$ content of 0.04% was obtained by pickling steel plates. Carbon black having an average particle diameter of 0.1 μm and having hydrophilic functional groups on its surface (hereinunder referred to as modified carbon black A) was added to the waste pickling solution in a range of 0–200 ppm. The solution was then stirred at 200 rpm for a prescribed length of time at 60° C.

Modified carbon black A was obtained by oxidizing the surface of carbon black having the above-noted average particle diameter by treating it for three hours at 60° C. in a 4N nitric acid solution.

After stirring for the prescribed time, the waste pickling solution was passed through a filter having an average pore diameter of 1 μm, and the filtrate was converted into ferric oxide by spray roasting at 600° C.

Figure 10:
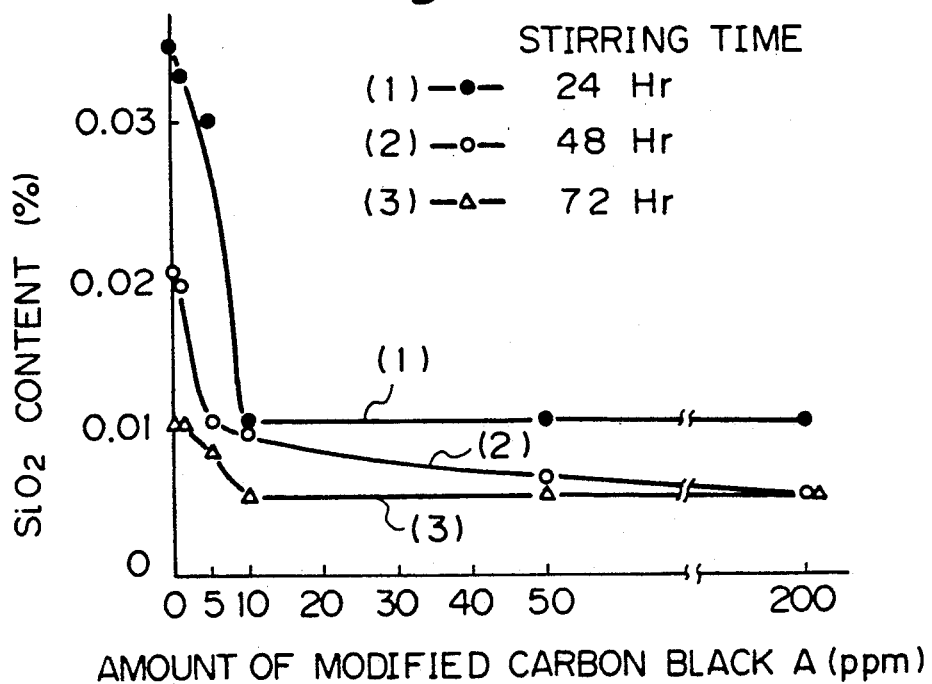

FIG. 10 shows the relationship between the amount of modified carbon black A which was added to the waste pickling solution and the $SiO_2$ content of the resulting ferric oxide. In the figure, curve 1 indicates stirring for 24 hours, curve 2 indicates stirring for 48 hours, and curve 3 indicates stirring for 72 hours. It can be seen that the addition of modified carbon black A to a waste pickling solution greatly decreased the $SiO_2$ content of the resulting ferric oxide. When stirring is performed for 48 hours, ferric oxide having an $SiO_2$ content of at most 0.01% can be obtained by the addition of at least 5 ppm of modified carbon black A to the waste pickling solution. If the stirring period is shortened, it is necessary to somewhat increase the amount of modified carbon black A which is added, and if the stirring period is lengthened, the amount which is added can be decreased. The addition of more than 50 ppm of modified carbon black A produces no significant further improvements, regardless of how long stirring is performed. Thus, the addition of even a minute quantity (5 ppm) of modified carbon black A greatly promotes the coagulation of silicic acid.

EXAMPLE 8

A waste pickling solution was treated using a different type of carbon black having hydrophilic functional groups. This carbon black, referred to as modified carbon black B, was obtained by oxidizing the surface of carbon black having an average particle diameter of 0.5 μm in moist air at 250° C. for 1 hour. Modified carbon black B was added in an amount of 5 ppm to a waste pickling solution having an $SiO_2$ content of 0.04%. The solution was then stirred at 200 rpm for a prescribed length of time at 60° C. After stirring, the waste pickling solution was filtered through a layer of carbon fibers which had undergone surface oxidation in the above-described manner and which had an average diameter of 20 μm. The stack of carbon fibers had a porosity of 80% and a height of 20 cm. The resulting filtrate was converted into ferric oxide by spray roasting at 600° C.

Table 7 shows the SiO$_2$ content of the resulting ferric oxide. It can be seen that the addition of modified carbon black B decreased the SiO$_2$ content with a much shorter stirring time than when there was no addition.

TABLE 7

| Stirring Time (hr) | SiO$_2$ Content of Ferric Oxide (%) Amount of Modified Carbon Black B Added (ppm) | |
|---|---|---|
| | 0 | 5 |
| 24 | 0.027 | 0.020 |
| 48 | 0.015 | 0.006 |
| 72 | 0.007 | 0.004 |

Example 9 which follows illustrates filtration of a waste pickling solution through a layer of sludge which was separated from a waste pickling solution.

EXAMPLE 9

A waste pickling solution was treated using a filtering apparatus like that illustrated in FIG. 3. A filter membrane 2 having an average pore diameter of 5 μm was installed in the filter housing 1. Sludge which was obtained using the method of Example 3 was dispersed in water to form a slurry, and the slurry was poured into the housing 1 from the sludge storage tank 5 to form a sludge layer 3 with a thickness of 10 mm atop the filter membrane 2. Next, a waste pickling solution at 60° C. which had an SiO$_2$ content of 0.04% and which had just been formed by pickling of steel plates was poured into the filter housing 1 from the waste pickling solution tank 4 and was filtered through the sludge layer 3 and the filter membrane 2 at a linear speed of filtration of 0.5 mm/sec. The resulting filtrate was collected in the filtrate tank 6. The SiO$_2$ content of the filtrate was 0.008%. This filtrate could be roasted to form ferric oxide corresponding to JIS Class 1 ferric oxide.

When waste pickling solution was filtered continuously for 24 hours under the above conditions, the linear speed of filtration decreased. Therefore, water was passed into the filter housing 1 upwardly from the backwash tank 7, the sludge which lay atop the filter membrane 2 was removed to form a slurry, which was recovered in the sludge storage tank 5. Next, the slurry was again formed into a sludge layer atop the filter membrane 2 in the above-described manner. When waste pickling solution was again passed through the reformed sludge layer under the above-described conditions, the SiO$_2$ content of the filtrate was decreased to the same degree as above. Thus, upon reuse, the sludge layer 3 was still able to decrease the SiO$_2$ content of the filtrate so that it could be used for the manufacture of JIS Class 1 ferric oxide for soft ferrite, just as upon the first filtration. Filtration and the reformation of the sludge layer were repeated a number of times. No substantial decrease in the ability of the sludge layer to remove silicic acid was observed.

What is claimed is:

1. A method of removing silicon from a waste hydrochloric acid pickling solution for steel stock, comprising
    adding a water insoluble substance having hydrophilic functional groups on the surface thereof to a waste hydrochloric acid pickling solution, which water insoluble substance is obtained by solid liquid separation of an aged waste hydrochloric acid pickling solution, and which water insoluble substance is added in an amount of from about 0.1 to 10 g dry weight per liter,
    stirring the waste hydrochloric acid pickling solution long enough to form a sludge having an average particle diameter of at least 0.1 micron, and
    then separating solids from the waste pickling solution.

2. A method of removing silicon from a waste hydrochloric acid pickling solution for steel stock, comprising
    adding a water insoluble substance having hydrophilic functional groups on the surface thereof to a waste hydrochloric acid pickling solution, which water insoluble substance is a carbonaceous material selected from carbon black and acetylene black which has undergone surface oxidation and wherein said carbonaceous material is added in an amount of from about 5 to 50 ppm,
    stirring the waste hydrochloric acid pickling solution long enough to form a sludge having an average particle diameter of at least 0.1 micron, and then separating the solids from the waste pickling solution.

3. A method for removing silicon from waste hydrochloric acid pickling solution for steel stock, comprising performing solid-liquid separation of an aged waste hydrochloric acid pickling solution for steel stock, forming the resulting solids into a layer, and filtering a waste hydrochloric acid pickling solution through the layer of solids.

4. A method as claimed in claim 3, wherein said filtration is performed at a linear speed of filtration such that a filtrate is obtained which has a silicon content, expressed as a converted SiO$_2$/Fe$_2$O$_3$ weight ratio, of at most 0.01%.

* * * * *